United States Patent [19]

Voecks et al.

[11] Patent Number: 5,252,528
[45] Date of Patent: Oct. 12, 1993

[54] HOT GAS, REGENERATIVE, SUPPORTED H₂S SORBENTS

[75] Inventors: Gerald E. Voecks, La Crescenta; Pramod K. Sharma, Pasadena, both of Calif.

[73] Assignee: California Institute of Technology, Pasadena, Calif.

[21] Appl. No.: 489,315

[22] Filed: Mar. 26, 1990

Related U.S. Application Data

[63] Continuation of Ser. No. 123,036, Nov. 19, 1987, abandoned.

[51] Int. Cl.⁵ .............................................. B01J 20/18
[52] U.S. Cl. ...................................... 502/74; 502/60
[58] Field of Search ............... 502/60, 74; 423/244 R, 423/230

[56] References Cited

U.S. PATENT DOCUMENTS

| | | | |
|---|---|---|---|
| 3,953,587 | 4/1976 | Lee et al. | 423/230 |
| 4,244,937 | 1/1981 | Durkin | 423/244 R |
| 4,497,902 | 2/1985 | Bertolacini et al. | 423/244 |
| 4,673,557 | 6/1987 | Nieskens et al. | 423/230 |
| 4,729,889 | 3/1988 | Flytani-Stephanopoulos | 423/593 |

Primary Examiner—Carl F. Dees
Attorney, Agent, or Firm—Marvin E. Jacobs

[57] ABSTRACT

Efficient, regenerable sorbents for removal of H₂S from moderately high temperature (usually 200° C.–550°C.) gas streams comprise a porous, high surface area aluminosilicate support, suitably a zeolite, and most preferably a sodium deficient zeolite containing 1 to 20 weight percent of binary metal oxides. The binary oxides are a mixture of a Group VB or VIB metal oxide with a Group IB, IIB or VIII metal oxide such as V-Zn-O, V-Cu-O, Cu-Mo-O, Zn-Mo-O or Fe-Mo-O contained in the support. The sorbent effectively removes H₂S from the host gas stream in high efficiency and can be repetitively regenerated at least 10 times without loss of activity.

14 Claims, 4 Drawing Sheets

HOT GAS, REGENERATIVE, SUPPORTED H₂S SORBENTS

ORIGIN OF THE INVENTION

The invention described herein was made in the peformance of work under a NASA contract, and is subject to the provisions of Public Law 96-517 (35 USC 202) in which the Contractor has elected to retain title.

This is a continuation of application Ser. No. 123,036, filed Nov. 19, 1987 now abandoned.

BACKGROUND OF THE INVENTION

The present invention relates to novel regenerative sorbents for high temperature removal of $H_2S$ from gas streams and, more particularly, gas streams resulting from the gasification of coal and heavy oil residues.

High temperature desulfurization of coal-derived fuel gas offers potential improvements on the thermal efficiency of systems using coal gasification such as power plants (high temperature fuel cells, combined cycle) and synthesis gas conversion plants (ammonia, methanol). Over the last ten years, several sorbents have been proposed and investigated for the regenerative removal of the main sulfur compound, i.e., hydrogen sulfide, from fuel gas at high temperatures. The level of $H_2S$ removal needed depends on the end use of the fuel gas. For power plant combustion purposes, removal down to about 100 ppm is adequate, but for molten carbonate fuel cell applications removal down to a level of 1 ppm may be required.

LIST OF PRIOR REFERENCES

1. "Chemistry of Hot Gas Cleanup in Coal Gasification and Combustion," MERC Hot Gas Cleanup Task Force. MERC/SP-78/2, February 1978.
2. "Studies Involving High Temperature Desulfurization/Regeneration Reactions of Metal Oxides for the Fuel Cell Program," Final Report to DOE, Contract No. 31-109-38-5804.
3. Westmoreland, P. R., Gibson, J. B., and Harrison, D. P., Environ. Sci. Technol. 11, 488 (1977).
4. Westmoreland, P. R. and Harrison, D. P., Environ. Sci. Technol. 10, 659 (1976).
5. Grindley, T. and Steinfeld, G., "Development and Testing of Regenerable Hot Coal Gas Desulfurization Sorbents," METC, DOE/MC/16545-1125, October 1981.
6. Anderson, G. L. and Garrigan, P. C., "Gas Processing Technology for Integrating Coal Gasifiers with Molten Carbonate Fuel Cells." Paper presented at the Electrochemical Society Meeting, Montreal, Quebec, Canada, May 10–12, 1982.
7. Stegen, G. E., "Development of a Solid Absorption Process for Removal of Sulfur from Fuel Gas." Final Report DE-AC21-79ET11028 Battelle, Pacific Northwest Laboratories, March 1982.
8. Pollard, A. J., "Proposed Phase Diagram for the System Vanadium Pentoxide-Zinc Oxide." U.S. Naval Research Lab., NRL Rep. 5960, Washington, D.C., July 1963.
9. Cirilli, V., Burdaco, A., and Brisi, C., Atti. Accad. Sci Torino 95, 15 (1961).
10. Kunev, D. K., Belyaevskaya, L. V., and Zelikman, A. N., Russian J. of Inorganic Chemistry 11, 1063 (1966).
11. Longo, J. M., Horowitz, H. S. and Clavenna, L. R., "A Low Temperature Route to Complex Oxides." Advances in Chemistry Series No. 186, p. 139, American Chemical Society, Washington, D.C., 1980.
12. Singh, B. N., Banerjee, R. K., and Arora, B. R., J. Thermal Analysis 18, 5 (1980).
13. Kolta, G. A., El-Tawil, S. Z., Ibrahim, A. A., and Felix, N. S., Thermochim, Acta 36, 359 (1980).
14. Marcilly, C., Courty, P. and Delmon, B., J. AM Ceramic Soc. 53, No. 1, 56 (1970).
15. U.S. Pat. No. 1,851,312, W. J. Huff.
16. U.S. Pat. No. 2,019,468, T. S. Bacon.
17. U.S. Pat. No. 2,551,905, S. P. Robinson.
18. U.S. Pat. No. 3,429,656, W. F. Taylor et al.
19. U.S. Pat. No. 3,739,550, Kruel Martin et al.
20. U.S. Pat. No. 4,197,277, Andre Sugier et al.
21. U.S. Pat. No. 4,207,209, Sinpei Matsuda et al.
22. U.S. Pat. No. 4,283,380, Robert Voirin et al.
23. U.S. Pat. No. 4,310,497, Andre Deschamps et al.
24. U.S. Pat. No. 4,455,286, J. E. Young et al.
25. Barrin, I. and Knacke, O., "Thermochemical Properties of Inorganic Substances," Springer Verlag, 1973.
26. Tamhankar, S. S., M. Bagajewiczz, G. R. Gavalas, P. K. Sharma, and M. Flytzani-Stephanopoulos, *Mixed-Oxide Sorbents for High-Temperature Removal of Hydrogen Sulfide*, I & EC Process Design Development, 24, No. 2, 429, 1986.
27. Flytzani-Stephanopoulos, M., G. R. Gavalas, S. S. Tamhankar, and P. K. Sharma, *Novel Sorbents for High Temperature Regenerative H₂S Removal*, JPL Publication 85-80, Jet Propulsion Laboratory, Pasadena, Calif., October 1985.

DISCUSSION OF PRIOR ART

The thermodynamics of various sorbents have been analysed in (1) and (2) among other reports. Comprehensive surveys of experimental work encompassing various high temperature sorbents have also been published (1-7).

The overall performance of a sorbent depends on a variety of properties. Thermodynamics and kinetics of sulfidation are obvious factors, for they determine the overall sulfur capacity before breakthrough of some predetermined level of $H_2S$. Kinetics encompasses the rates of purely chemical steps as well as the rate of pore diffusion and, more particularly, diffusion in the sulfide product layer. Surface area and pore size distribution are very important sorbent properties as they determine the rate of these diffusional processes. Zinc oxide, one of the most promising and widely studied sorbents, has very high equilibrium constant for sulfidation but in its unsupported form it suffers from slow kinetics limiting its sulfidation capacity. Iron oxide, on the other hand, has rapid kinetics but is equilibrium constant for sulfidation is not adequate for the degree of $H_2S$ removal required in the molten carbonate fuel cell application.

The other important sorbent properties refer to (1) stability or regenerability in extended use, (2) the operating conditions required for regeneration, and (3) the composition of the regeneration off-gas, which largely determines the choice of a downstream sulfur recovery process. Using zinc oxide as an example again, it is well known that evaporative loss of metallic zinc places an upper limit on the sulfidation temperature. Loss of surface area during regeneration places a lower limit on regeneration temperature or necessitates a more complicated regenerative treatment. The regeneration off-gas, including sulfur dioxide, hydrogen sulfide and elemental sulfur, requires further treatment for sulfur recovery. When the yield of elemental sulfur is sufficiently high, sulfur recovery can be simplified with significant overall cost benefits (6).

These references emphasize the need for improved sorbents for the high temperature desulfurization of coal-derived gas streams.

In the U.S. patents listed above Young et al (24) is the most relevant in disclosing the use of CuO and ZnO mixtures as high temperature (500°-700° C.) regenerable sorbent for $H_2S$ in a hot gas stream fuel for a fuel cell. These mixtures are not molten during any stage of the desulfurization process and do not provide effective sulfur capacity or regenerability. Robinson (17) also discloses desulfurization of a gas at high temperature. 1000° F. pebbles of refractory material heat the gas from 300° to 750° F. The pebbles are regenerated with hot air or air/stream mixtures.

The remaining U.S. patent references disclose various regenerable $H_2S$ sorbents. Huff (15) discloses mixtures of CuO with an oxide of a Group V or VI metal to desulfurize a combustible gas at a temperature above 200° C. in the presence of oxygen. Sugier (20) desulfurized gases containing $H_2S$, $SC_2$, COS or mercaptans with mixtures of vanadium oxide and iron oxide on alumina support at temperatures of 150° C. and 200° C. Matsuda et al (21) sinter titanium, molybdenum oxide and one of numerous active metal oxides to form a desulfurization sorbent. Voirin et al (22) absorb sulfur oxide-containing gases in alumina, carrying a salt or oxide of a metal and then regenerated the sorbent with $H_2S$ at 250° C. to 450° C. Martin et al (19) desulfurize a $CO_2$ containing waste gas with a regenerable carbonsorbent containing a mixture of vanadium with K, Li or Ba and optimally Al, Cr, Si or P. Taylor et al (18) disclose a porous solid catalytic element for oxidizing sulfur and carbon oxides in automobile exhaust gas. The catalytic material can be at least one of manganese, copper, or vanadium oxide interspersed with alumina and sodium oxide.

With several of the thermodynamically favorable, high temperature $H_2S$ sorbents reported to date, slow rates of reaction and pore diffusion, sintering, and pore plugging limit sorbent capacity and degree of purification under practical conditions. Such is the case with some commercial ZnO sorbents where reported conversions at breakthrough were less than 20 percent.

Recent research has shifted from pure to mixed metal oxides with the goal of improving sorbent performance. For example, zinc ferrite has been found to possess better capacity and regenerability than pure zinc oxide (5). Mixed ZnO-CuO has been studied for its better resistance to surface area loss (24) and various other mixtures including $ZnO-Cr_2O_3$ and $ZnO-Al_2O_3$ have been studied with the objective of increasing the yield of elemental sulfur during regeneration (6). Mixed oxides form various distinct crystalline phases or solid compounds, and should generally possess different thermodynamic properties and reactivity with respect to reduction, sulfidation, and regeneration reactions. This has so far received limited attention.

Various mixed metal oxide combinations (26, 27) disclosed in Ser. No. 717,333, filed Mar. 29, 1985 now U.S. Pat. No. 4,719,889, the disclosure of which is expressly incorporated herein by reference, have been demonstrated to serve as excellent regenerative sorbents for removing hydrogen sulfide from hot reducing gas mixtures typical of coal gasifiers, autothermal reformers, etc. These materials have been demonstrated to be maintained in their active state while in the temperature range of 550°-700° C. but mainly in an unsupported state, i.e., not on conventional supports used for heterogeneous catalysts to maintain usable forms of pellets, particles, monolithic columns, etc. To date, the mixed metal oxide sorbent materials capable of reducing $H_2S$ to very low levels (<10 ppm) and being fully regenerable have been synthesized in the form of submillimeter sized, friable, uncontrolled shapes of material containing alumina which does not have the structural integrity for use in industrial practice. Current efforts to produce pelletized mixed metal oxides/alumina material and to determine the subsequent performance as $H_2S$ sorbents is proceeding under DOE auspices.

In addition, there are several applications where a lower temperature requirement for sulfur removal is required, but without sacrificing either activity or capacity. Repeated regeneration of this material is, of course, also necessary. Sulfur removal from high temperature steam reformers or hydrodesulfurizing units are two important applications for fuel cells where sulfur removal in the temperature range 250°-400° C. is desirable. Sour gas sweetening by removal of $H_2S$ and $CO_2$ is another important application. In this particular application, important in the petrochemical industry, $H_2S$ must be removed by the sorbent system effectively in the temperature range 350°-400° C. while $CO_2$ can be removed in a second stage by plain zeolite at room temperature.

Liquid amines such as methyldiethanolamine are effectively used in gas scrubbing units to selectively absorb $H_2S$ from gas streams such as natural gas and ammonia synthesis or reformer gas streams. However, amine scrubbing units operate at low temperature and low circulation rate. This is thermally inefficient since the hot gas stream must be cooled before scrubbing and reheated after scrubbing. Low flow rates and low temperatures are necessry to reduce boiling and formation of aerosols which will carry over into the next unit.

The mixed oxide sorbents can selectively remove $H_2S$ from a $CO_2$ containing gas stream at temperatures from 300°-500° C. Since they involve a solid-refractory system, there is no tendency to contribute liquid or gaseous impurities into the gas stream. However, it is difficult to support these sorbents on porous, solid carriers that are not deleteriously affected under the operating conditions of the sorption and regeneration processes such that the sorbent material can be repetitively regenerated to an active form with no significant loss in activity or capacity. Attempts to support mixed oxide sorbents on porous refractory substrates such as alumina were not satisfactory. Though the alumina supported mixed oxide sorbents deomonstrate sorption activity in giving an initial zero outlet $H_2S$ concentration, the sorbent removal of $H_2S$ gradually deteriorated to 75% by the third cycle. Further the regeneration rate is slow and the sorbent showed a small loss of metal oxide. Industrial processes normally utilize a pair of sorbent units, one on-line receiving a flow of gas to be treated and one off-line receiving a flow of regeneration gas. If the regeneration rate is too slow, the process is thermally and economically inefficient and much more complex requiring the use of a plurality of units being regenerated at various stages for each absorption unit in operation.

STATEMENT OF THE INVENTION

A mixed oxide sorbent supported on a porous alumina silicate material has been found to efficiently remove hydrogen sulfide from a hydrogen rich gas mixture at temperatures from 200° C. to 550° C. The supported sorbent of the invention is conveniently regenerated to full capacity in acceptable time periods by treatment with oxygen containing gas at temperatures from 550° C. to 700° C., preferably from 600°-650° C. The sorbent material can function in the presence of CO and $CO_2$ and retains high capacity for hydrogen sulfide removal for over 10 cycles in stoichiometric proportion relative to the active metal oxide contained in the sorbent.

The porosity of the alumino-silicate support is sufficient to provide adequate gas throughput in practical, industrial time periods and to provide plug-like absorption performance. The surface area of the fresh support is from 10 to 500 $m^2/g$. The surface area of the support after loading with mixed metal oxides is at least 0.1 $m^2/g$ up to 300 $m^2/g$. The amount of mixed metal oxide loaded on the support is sufficient to provide high performance absorption of $H_2S$ from moderately hot gas. The mixed metal oxide is usually present in the support in an amount from 1 to 20 percent by weight usually from 5 to 15 pecent by weight.

The preferred supports for the mixed metal oxide sorbents are molecular sieves such as Group I, II or III metal alumino-silicates preferably the common sodium or calcium alumino-silicates having an $AlO_2/SiO_2$ ratio within ±20 percent of stoichiometry of the particular crystalline class employed. Rare earth zeolites can also be utilized as sorbents of the invention.

Because of the high porosity, rigid framework, alumina content, and variety of both composition and form (pellets, washcoat, etc.). zeolites make the ideal choice for use as support for the mixed oxide $H_2S$ sorbents for use in moderate temperature applications.

Synthetic sodium zeolites (4A type) with a $AlO_2SiO_2$ ratio of 12/12 usually have a free lattice opening of about 3.5 Angstroms while the calcium analog (5A type) has a free lattice opening of about 4.2 Angstroms. The X types have larger latticed openings such as the 13X type which has a free lattice opening of about 10 Angstroms and a $SiO_2/AlO_2$ ratio of 106/86. Highest performance is obtained by use of a sodium deficient 4A type.

The mixed metal oxide sorbents are binary oxide mixtures such as a Group VB, or VIB metal oxide mixed with a Group VIII, IIB or IB metal oxide. The binary oxide preferably forms on the surface of the pores of the molecular sieve lattice. During sorption while at temperatures of from 250° C. to 550° C., the metal oxides are converted to metal sulfides and during regeneration the metal sulfides are reconverted to the active metal oxide form.

Representative mixed metal sorbents are Cu-Mo-O, Zn-Mo-O, V-Cu-O and V-Zn-O. The ratio of the Group IV, IIB or VIII metal oxide to the Group VB or VIB metal oxide is usually above 1 and no more than 5, preferably from 2.0 to 4.0. Highest performance appears to be obtained with Cu-Mo-O mixed oxides supported on sodium deficient 4A type zeolites.

Supporting the mixed Cu-Mo oxide in the molar ratio 3:1 on sodium deficient zeolite 4A offers a high performance sorbent for efficient removal of $H_2S$ from a moderately hot (250°-540° C.) hydrogen/steam-rich stream. If CO and $CO_2$ are also present in the fuel gas, nearly complete sorbent conversion is restricted to the temperature range 350°-400° C. The experimental results show that molecular sieve 4A: 1) removes the $H_2S$ down to levels of less than 1 ppm in a reproducible, repetitive manner, 2) operates at the high level of performance over a range of temperatures, 3) is consistently regenerable over a temperature of 600°-650° C.) 4) operates at nearly stoichiometric removal proportions relative to copper content, 5) maintains a plug-flow performance profile of $H_2S$ removal during each sorption segment of the cycles, and 6) is superior to molecular sieves 5A, 13X and alumina. This combination of sorbent/support has been shown to possess the characteristics necessary for $H_2S$ removal from a fuel processor which incorporates a high temperature steam reformer that is operating on a hydrocarbon feed such as No. 2 Diesel fuel. Another important application of the sorbent system developed here is in sweetening sour gas by selective removal of $H_2S$.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
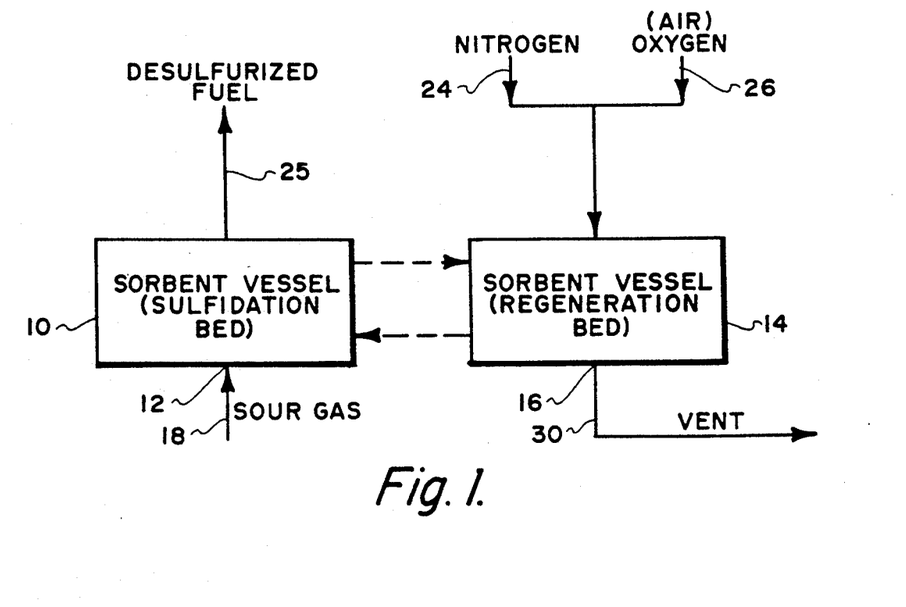
FIG. 1 is a schematic-block diagram of the process for removal of $H_2S$ from a hot gas stream in accordance with the invention.

Referring now to FIG. 1, a schematic apparatus for producing the $H_2S$ adsorption process of the invention is illustrated. The molecular sieve supported, mixed metal oxide sorbent of the invention is provided in the form of two gas permeable sulfidation beds, 10 in sorbent vessel 12 which is shown on-stream removing $H_2S$, and 14 in sorbent vessel 16 which is shown being regenerated. The sorbent can be in the form of uneven or shaped particles or in the form of monolithic supports made up of a series of columns or channels or in the form of a wash coat of zeolite on a monolithic support.

The sorbent vessel 12 receives a flow of hot, hydrogen rich, sour gas through line 18. The gas flows through the bed 10, enters the pores of the mixed oxide supported sorbent and reacts with the metal oxide to form metal sulfide. A $H_2S$ free fuel stream leaves the vessel through line 20 and can be sent to a sulfur recovery unit, sulfuric acid production unit, an $SO_2$ scrubber or to exhaust.

During regeneration of the sulfided bed 14, a hot regeneration gas stream is formed from nitrogen and oxygen or air. The source of these may be from the exhaust of other systems of the total operating unit of which the $H_2S$ removal is one part. The regeneration gas enters vessel 16, flows through bed 14 and regenerates the metal sulfide to metal oxide and sulfur dioxide. The sulfur dioxide containing gas stream may be treated in any of a variety of well-known methods. The ratio of inert to oxidizing gas and the temperature of the vessel undergoing regeneration 16, are matched to maintain the same time interval between regeneration and on-line $H_2S$ sorption. The preferred regeneration gases for economic, commercial operation are nitrogen and air, usually a range of dilution ratios of nitrogen to air being of the order of 60/40 to 80/20, by volume with 70/30 being the preferred ratio. The nitrogen source may be from the exhaust of the sulfur dioxide removal system which would reduce the amount of nitrogen make-up required. The air source may be a fuel cell cathode exhaust which is oxygen-poor and would require no nitrogen diluent. The temperature of the regeneration gas should be maintained below 700° C. to prevent volatization and/or sintering of the metal oxide mixture. Generally, the regeneration temperature will be from 500° C. to 700° C., preferably from 600° C. to 650° C.

Based on prior work at the higher range of absorption temperatures, (26, 27), the copper/molybdenum mixed oxide was selected as the most active sorbent. Three conventional zeolites were then tested to determine the impact of the zeolite on the sorbent activity, regenerability and stability. Evaluation of the sorbent-impregnated zeolites was performed over a temperature range of 256° C. to 600° C.

The preparation used involved the use of a precursor solution of Cu and Mo salts which was allowed to penetrate the zeolite particles by the incipient wetness process.

EXPERIMENTAL

Sorbent Preparation

The sorbent preparation consisted of the incipient impregnation of a solution containing basic cupric carbonate and ammonium molybdate on the molecular sieve support (sodium forms of 4A, 5A, 13X or sodium deficient 4A) and subsequent calcination of the resulting material.

In a typical preparation, 2.085 g of basic cupric carbonate $[CuCO_3Cu(OH)_2]$ and 1.110 g of ammonium molybdate were dissolved together in 50 ml of concentrated $NH_4OH$ (58%) solution. This solution was used to impregnate 10 g of the support material. (In an alternative impregnation approach, only 4 to 5 ml of the solution was added to the support material with agitation so that all the added solution was absorbed by the support and no liquid was visible outside the particles.) After adding the solution, the support material was dried in an air oven at 110° C. for 1 to 2 hours. The dried material was then removed from the air oven, cooled to room temperature and the impregnation was repeated. A total of 8 to 10 impregnations were needed to treat each support material with the prepared solution.

Calcination was carried out in a muffle furnace at 600° C. for 3 to 6 hours under an oxygen-rich atmosphere. This atmosphere was maintained by a small flow of oxygen through a metal tubing inserted into the furnace.

At the end of the calcination, the sorbent consisting of the support impregnated with the active material was taken out of the furnace, air-cooled, and then analyzed for Cu and Mo concentrations by atomic absorption spectroscopy (AA) and for surface area by the BET method. Table 1 gives the Cu and Mo concentrations and BET surface areas for various sorbent preparations.

Sodium deficient zeolite 4A, used as a support for carrying out impregnation with the Cu-Mo solution in one of the preparations, was prepared by treating the sodium form of zeolite 4A with a 1.0 molar solution of ammonium nitrate ($NH_4NO_3$) to lower the sodium content below 12 wt. percent, generally from 1 to 3 wt. percent. Zeolite 4A and the ammonium nitrate solution were mixed and allowed to stay in contact at room temperature for 24 hours with periodic stirring. At the end of this period, the zeolite was separated, washed with distilled water, and the treatment with $NH_4NO_3$ solution was repeated. This process typically lowered the sodium content of the zeolite from 12.0 wt. percent to 2.5 wt. percent.

The uniformity of the distribution of the active material (CuO and $MoO_3$) on the zeolite pellet was determined by conducting SEM/EDS analyses on a cross-section of a pellet. This analysis indicated uniform distribution of both Cu and Mo on the entire cross-section.

Apparatus and Procedure

The experimental set up consisted of a gas mixing device, a steam generator, a quartz microreactor, and a Model 5830 Hewlett Packard gas chromatograph equipped with a flame photometric detector. A more detailed description is provided elsewhere, (26).

The 26 mm long sorbent bed occupied the middle section of the 12 mm i.d. quartz reactor tube. The bed temperature at the middle was monitored by means of a type K thermocouple which was introduced into the centerline of the bed through a 3 mm o.d. quartz well.

Sorbent Performance

The various sorbents were tested in a series of cycles including both sulfidation and regeneration. Various sorbent attributes important for practical applicability, such as sulfidation and regeneration temperatures and rates, completeness of regeneration, and structural integrity were studied.

TABLE 1

| | Sorbent Active Material Analysis | | | | | |
|---|---|---|---|---|---|---|
| | | | | | SURFACE AREA $m^2/g$ | |
| Sorbent | Support | Cu Wt % | Mo Wt % | Support | Fresh Sorbent | Sulfided |
| LTCM | 4A | 6.47 | 2.90 | 36 | 16 | 3.2 |
| LTCM3 | 13X | 8.80 | 4.40 | 400 | 210 | 5.4 |
| LTCM4 | 5A | 7.60 | 3.08 | 340 | | 3.5 |
| LTCM5 | 4A | 6.50 | 2.90 | 36 | 17 | 5.0 |
| LTCM9 | Sodium deficient 4A | 5.69 | 2.75 | 34 | 30.0 | 5.4 |

The sulfidation performance of each sorbent was represented by breakthrough curves which plot the outlet $H_2S$ concentration (in ppm) versus normalized absorption time, $t/t^*$, where $t^*$ represents complete conversion of the active material based upon a specified reaction stoichiometry. Because $Cu_2S$ was usually the main component in the sulfided material and molybdenum sulfides were less often detected, $t^*$ was based on the sulfided species of Cu, $Cu_2S$, being formed.

Sorbents LTCM and LTCM5

[$3CuO \cdot MoO_3$ supported on zeolite 4A]

These sorbents were tested for $H_2S$ removal at temperatures ranging from 250° to 540° C. in a series of cycles. Sulfidation gas consisted of 1% $H_2S$, 20% $H_2$, 25% $H_2O$, and 54% $N_2$ (molar basis) while regeneration was carried out with 70% $N_2$ and 30% air mixture at 600° to 650° C. The gas flows in both sulfidation and regeneration runs were 200 ml/min. These flow rates were maintained constant in each cycle. Space velocities were in the range of 2000 to 2500 $hr^{-1}$.

EXAMPLE 1

Figure 2:
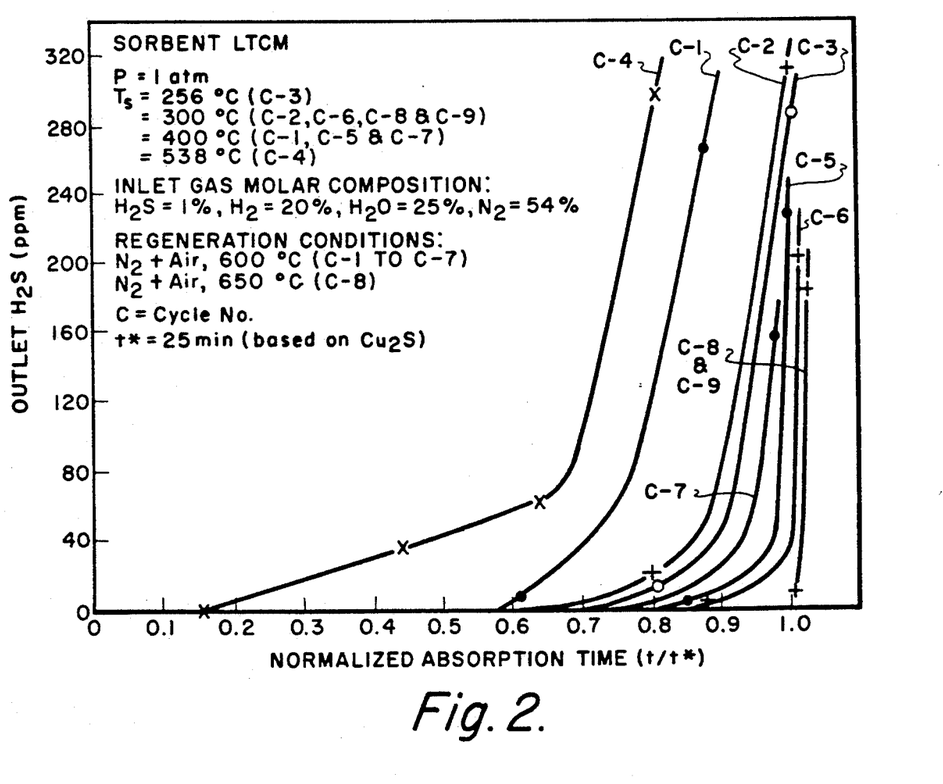
FIG. 2 is a series of curves showing sulfidation performance of LTCM sorbent ($3CuO.MoO_3$ supported on Zeolite 4A) with a reformed gas containing $H_2$ and $H_2O$.

FIG. 2 shows the breakthrough curves obtained with sorbent LTCM in nine cycles. It is seen that for all temperatures up to 400° C., the performance of this sorbent is very good. The sorbent appears to have stabilized after the first two cycles and $H_2S$ levels below 3 ppm are maintained up to 70 percent conversion ($t/t^* = 0.70$). More notably, the later cycles 8 and 9 are better than the earlier cycles.

EXAMPLE 2

Figure 3:
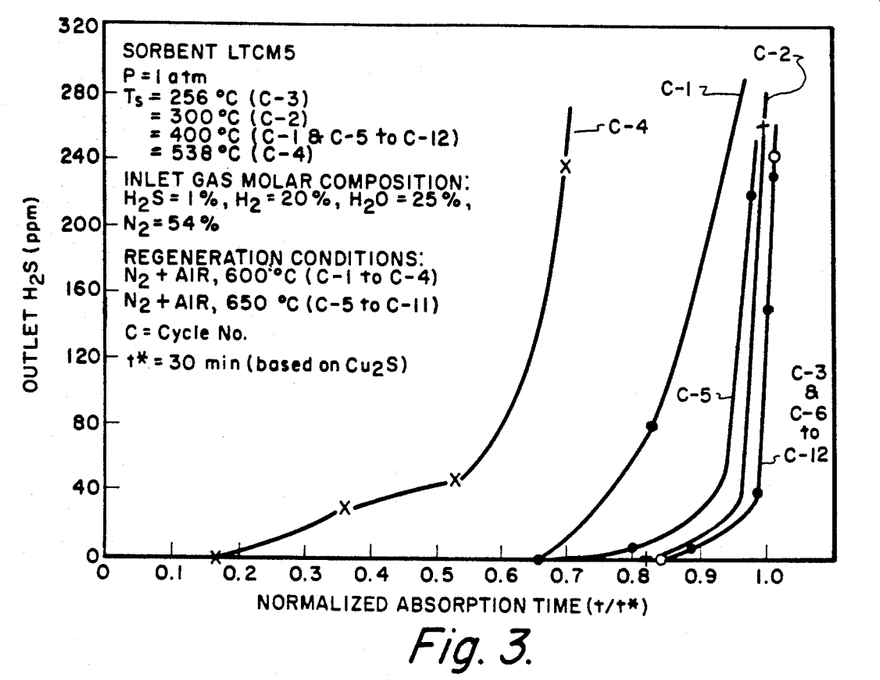
FIG. 3 is another series of curves showing sulfidation performance of LTCM5 sorbent ($3CUO.MoO_3$ supported on Zeolite 4A) with a reformed gas containing $H_2$ and $H_2O$.

Sorbent LTCM5 prepared under conditions identical to those for sorbent LTCM, was tested to verify experimental reproducibility. This sorbent was tested in a total of twelve cycles of sulfidation and regeneration. The test conditions in the first five cycles were identical to the test conditions in the corresponding cycles with sorbent LTCM and the performance of the two sorbents in these cycles was also seen to be very close to each other (FIG. 3). The sulfidation temperature used for LTCM5 for cycles 6 through 12 was 400° C. No significant change in either capacity or activity of this sorbent was observed during these cycles.

XRD analysis on sulfided sorbent LTCM yielded $Cu_2S$ as the main sulfur-containing species. It should, however, be noted that non-stoichiometric compounds and some molybdenum sulfides were also detected. For example, after sulfidation in cycle 4, sorbent LTCM was found to carry $Cu_{1.8}S$ and $Mo_2S_3$ in approximate ratio of 55 to 45. The very low pre-breakthrough $H_2S$ levels (less than 0.5 ppm) observed at 400° C. suggest that small amounts of molybdenum sulfides or Cu-Mo mixed sulfides may always be formed. This conclusion is based upon thermodynamic considerations which from calculated—$G^o$ values and (corresponding equilibrium constant values, $K_p$) suggest that $Cu_2S$ or $Cu_{1.8}S$ will not, by themselves, lead to such low $H_2S$ levels.

SEM/EDS analysis was also conducted on the sulfided sorbent LTCM. This analysis showed that sulfur was distributed uniformly over the pellet cross-section indicating efficient accessibility of the entire volume of the zeolite to the reacting gases.

EXAMPLE 3

Sorbent LTCM3

[$3CuO \cdot MoO_3$ supported on zeolite 13X]

This sorbent was tested in three cycles at temperatures from 256° to 400° C. The gas molar composition of the sulfidation gas mixture was again 1%, $H_2S$, 20%, $H_2$, 25% $H_2O$ and 54% $N_2$ and regeneration was carried out with a 70% $N_2$-30% air mixture at temperatures of 600° to 650° C. The gas flow in both sulfidation and regeneration runs was 200 cc/min and was maintained constant in each cycle.

Figure 4:
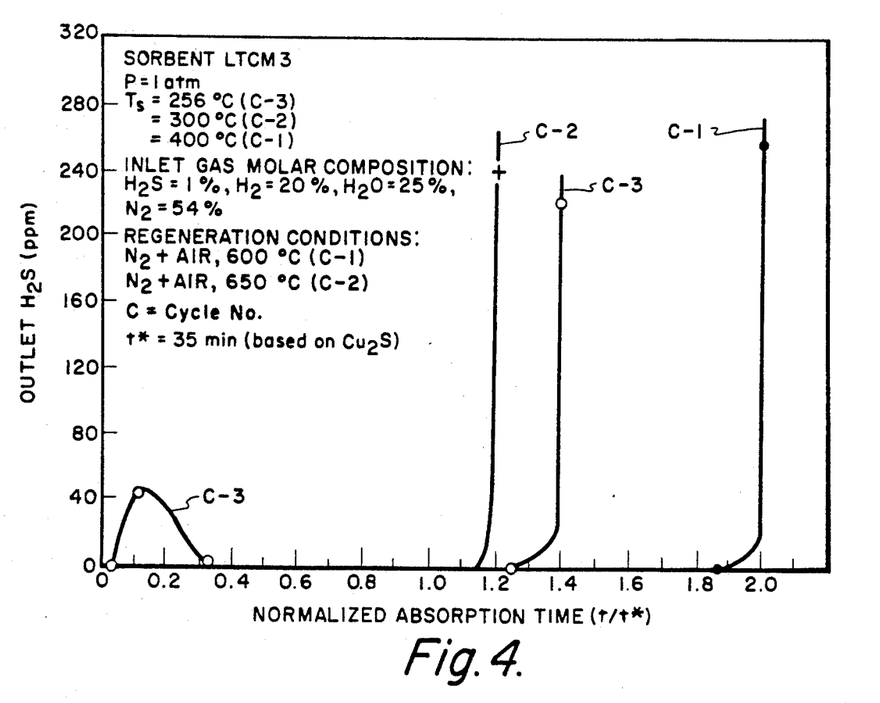
FIG. 4 is a series of curves showing sulfidation performance of LTCM3 sorbent ($3CuO.MoO_3$ supported on zeolite 13X)

FIG. 4 shows the breakthrough curves for sorbent LTCM3. Cycle 1 with this sorbent had a normalized breakthrough time about twice that of sorbent LTCM. This may be due to formation of CuS in place of the more common $Cu_2S$ during the first sulfidation. However, subsequent regeneration at 600° C. appeared to have resulted in appreciable sulfate formation. This was evident during sulfidation in the beginning of cycle 2 when a large quantity of $SO_2$ (1000 to 2000 ppm) was released continuously for about 15 minutes and then decayed slowly. This $SO_2$ release points to rapid decomposition of the sulfate under reducing environment. The sorbent conversion during sulfidation in cycle 2 dropped appreciably from cycle 1 as seen clearly from FIG. 4. The regeneration step of the second cycle was carried out at 650° C. Subsequent sulfidation in cycle 3 indicated a lower level of residual sulfate. However, the $SO_2$ levels observed in this sulfidation were still high (about 100 ppm).

In addition to the aforementioned sulfate problems with sorbent LTCM3, a significant loss of the molybdenum component (by evaporation) was observed from this sorbent in all cycles. The molybdenum lost by evaporation condenses on the lower and cooler end of the quartz reactor tube and can be measured by dissolving it in an acid and conducting spectroscopic analysis on the solution. These observations of $SO_2$ formation and molybdenum loss indicate that this sorbent is not very promising.

EXAMPLE 4

Sorbent LTCM4

[$3CuO \cdot MoO_3$ supported on zeolite 5A]

This sorbent was tested in seven cycles at temperatures ranging from 300° C. to 600° C. The gas molar composition used for sulfidation was 1% $H_2S$, 20%, $H_2$, 25% $H_2O$, and 54% $N_2$. Regeneration was carried out with 70% $N_2$-30% air mixtures at temperatures of 600° to 650° C.

Figure 5:
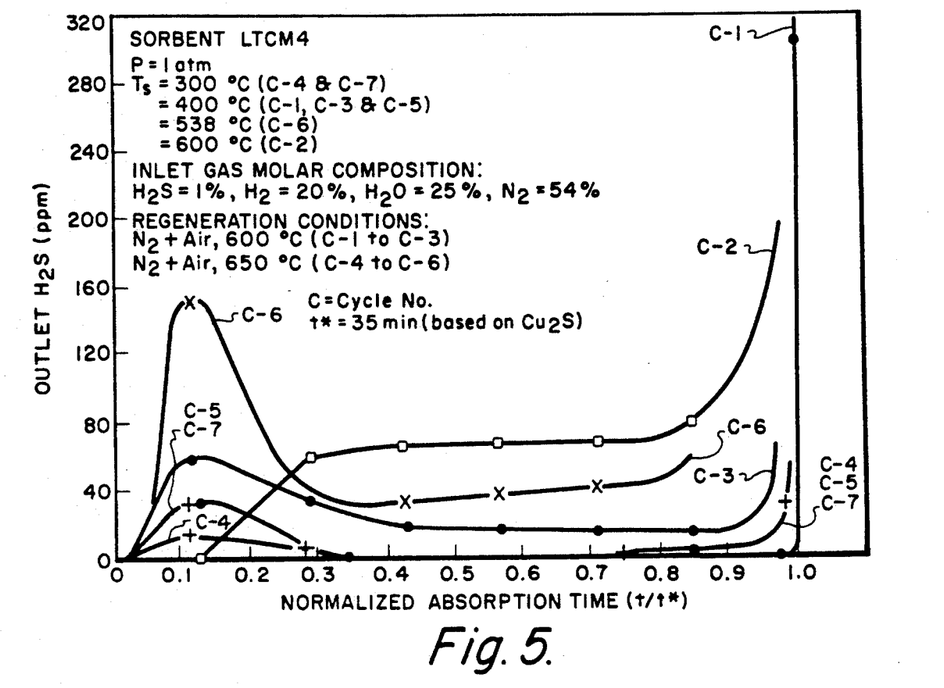
FIG. 5 is a series of curves showing sulfidation performance for sorbent LTCM4 ($CuO.MoO_3$ supported on zeolite 5A.

The performance of this sorbent, in general, was temperature dependent. The breakthrough curves obtained in sulfidation in various cycles are shown in FIG. 5. These curves shown an unusual pattern during sulfidation. Greater than equilibrium $H_2S$ evolution takes place at sorbent conversions of 10 to 15 percent resulting in a cluster of peaks around this conversion. This peculiar behavior is probably due to incomplete regeneration resulting from the specific sorbent pore structure. With the exception of this peculiarity, pre-breakthrough $H_2S$ levels generally stayed at or below the equilibrium levels at sulfidation temperatures of 300° and 400° C. The higher temperatures of 538° and 600° C., pre-breakthrough $H_2S$ levels of 40 and 70 ppm, respectively, were realized. These levels correspond to the thermodynimic equilibrium for the reaction:

$$2Cu + H_2S \rightleftharpoons Cu_2S + H_2$$

A trace amount of molybdenum was noticed to be lost from the sorbent based on condensation in the reactor tube. It was not established whether an equilibrium state may have been reached for molybdenum loss. The overall performance of this sorbent is seen to be better than LTCM3 but not as good as LTCM or LTCM5.

EXAMPLE 5

Sorbent LTCM9

[Supported $3CuO \cdot MoO_3$ on Sodium Deficient 4A]

This sorbent was tested in a series of fourteen cycles with a gas mixture containing 1% $H_2S$, $H_2$, 25% $H_2O$, 54% $N_2$ and another series of eight cycles with a gas mixutre consisting of 1% $H_2S$, 13% $H_2$, 15% CO, 10% $CO_2$, 19% $H_2O$ and 42% $N_2$ in the temperature range 300° to 400° C. for sulfidation. The latter gas mixture composition was selected to illustrate the effect of CO and $CO_2$ on the $H_2S$ removal efficiency of the sorbent.

Figure 6:
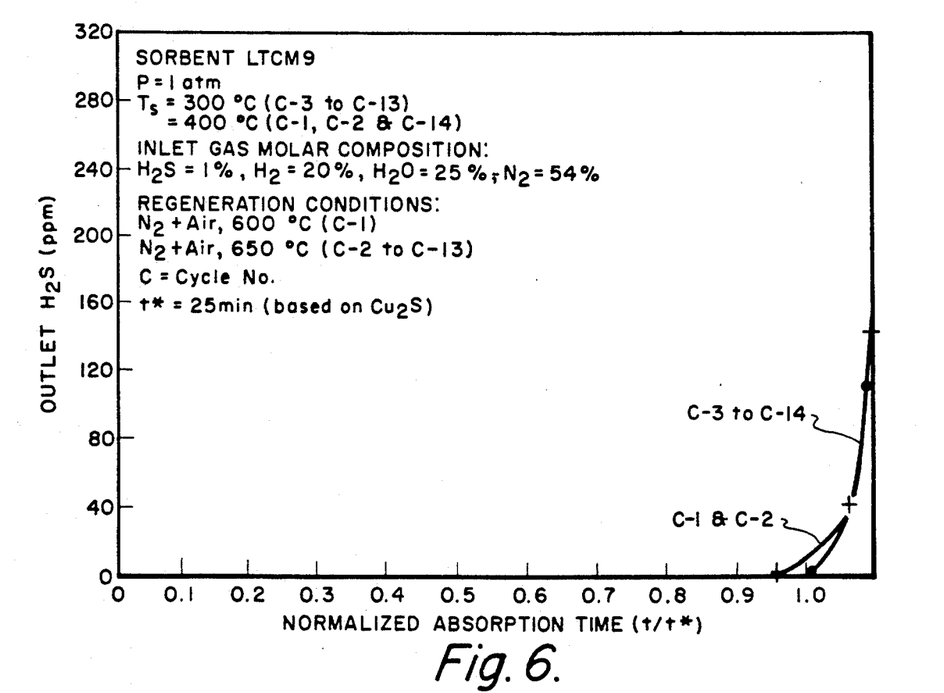
FIG. 6 is a series of curves showing sulfidation performance of sorbent LTCM9 ($3CuO.MoO_3$ supported on sodium deficient Zeolite 4A)

FIG. 6 shows the performance of sorbent LTCM9 in sulfidation with the gas mixture containing $H_2S$ with $H_2$ and steam. Sulfidation in cycles 1 and 2 extends to about 150 percent sorbent conversion (assuming 100 percent conversion corresponds to $Cu_2S$ formation) with pre-breakthrough $H_2S$ levels of less than 0.5 ppm. The reason for conversions in excess of 100 percent may be due to (a) partial CuS formation, (b) partial molybdenum sulfide (e.g. $Mo_2S_3$) formation, or (c) some combination of (a) and (b). During sulfidation in cycles 3 to 14, 100 percent sorbent conversion was achieved and pre-breakthrough $H_2S$ levels consistently stayed below 0.5 ppm. In addition to almost complete removal of $H_2S$ from the incoming gas stream, the $SO_2$ evolution during sulfidation was also very low in all runs made at 300° C. In these runs, $SO_2$ evolution was generally below 1 ppm and only occasionally went up to 5 ppm. In sulfidations carried out at 400° C., a relatively sharp peak of $SO_2$ (200-300 ppm) was observed at the beginning of the sulfidation run which decreased to below 1 ppm after a few minutes.

EXAMPLE 6

Figure 7:
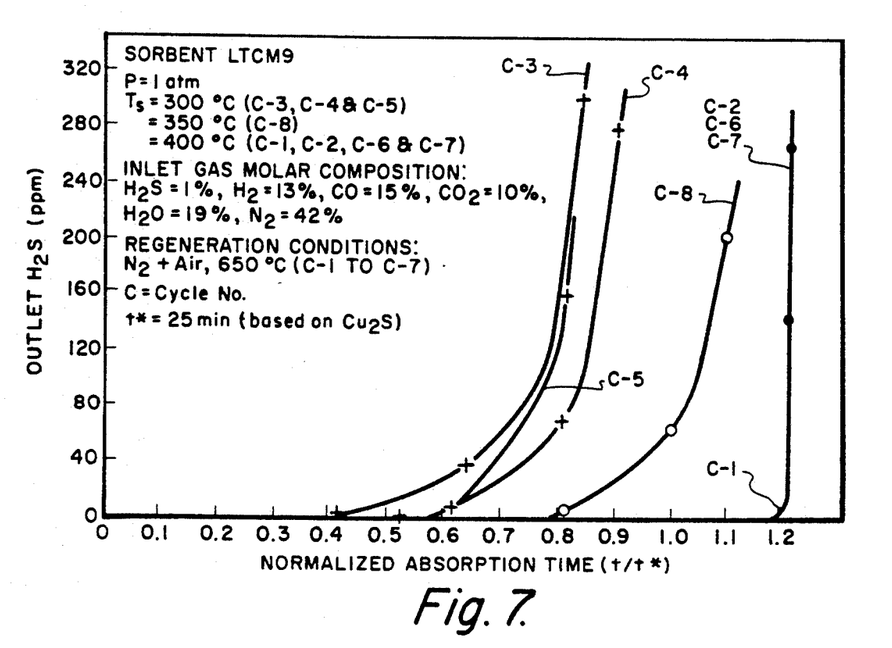
FIG. 7 is another series of curves showing sulfidation performance of LTCM9.

FIG. 7 illustrates the performance of sorbent LTCM9 in sulfidation with a simulated reformed gas with CO and $CO_2$ added to the gas mixture. The sulfidation temperature was varied from 300° to 400° C. It is seen from FIG. 7 that a relatively early breakthrough for $H_2S$ results at 300° C. as is clear from cycles 3, 4 and 5. At sulfidation temperature of 350° C. (cycle 8), the $H_2S$ breakthrough occurs after sorbent conversion of 0.75 is reached. However, at the sulfidation temperature of 400° C., as seen from cycles 2, 6, and 7, complete sorbent conversions are maintained and pre-breakthrough $H_2S$ levels are below 0.5 ppm. $SO_2$ peaks (200-300 ppm) were observed again at the beginning of each sulfidation, but decayed rapidly to less than 1 ppm.

A limited number of sulfidation and regeneration tests were also run with zeolite 4A as received to determine the contribution of the support in $H_2S$ removal. The sulfidations in these tests yielded very quick break- through for $H_2S$ and implied that no more than 15 percent of total $H_2S$ removal is due to the support.

EXAMPLE 7

Figure 8:
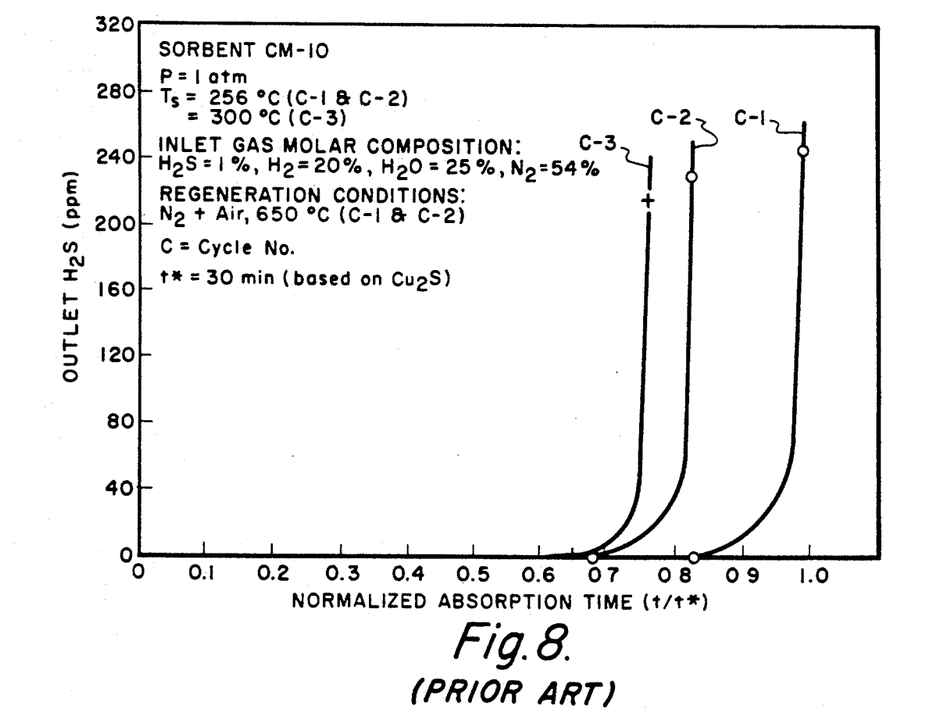
FIG. 8 is a series of $H_2S$ breakthrough curves for sorbent CM-10 ($3CUO.MoO_3$ supported on porous alumina.

In order to compare the zeolite support with the more conventional alumina support, a mixed Cu-Mo oxide ($3CuO \cdot MoO_3$) supported on high surface area alumina ($-80$ m$^2$/g, obtained from United Catalyst) designed by sorbent CM-10 was tested in three cycles in the temperature range 256°-300° C. The performance of this sorbent during sulfidation in the three cycles is shown in FIG. 8. As seen from FIG. 8, the sorbent conversion in successive cycles for this sorbent decreases from 1.0 in cycle 1 to 0.75 in cycle 3. In addition, regeneration of this sorbent was slow, requiring a regeneration time about three times that of the zeolite-supported sorbent LTCM and LTCM5. As a result, supporting the sorbent on alumina is not considered to be a suitable option.

The mixed metal oxide sorbent of the invention supported on zeolite (preferably copper and molybdenum on 4A Zeolite) has been found to remove hydrogen sulfide from a hydrogen-steam rich gas mixture at 256°-538° C. and regenerated to full capacity by treatment at 600°-650° C. with nitrogen and air. The sorbent material can function in the presence of CO and $CO_2$ and retains high capacity for hydrogen sulfide removal for at least 10 cycles in stoichiometric proportion relative to the copper content. The sorbent of the invention is found (1) to remove $H_2S$ from a $H_2/H_2O$ or $H_2/CO/CO_2/H_2O$ rich gas stream at a temperature of 300°-500° C., (2) to regenerate the material repetitively while maintaining activity and capacity, and (3) the support material is not deleteriously affected by the operating conditions and is commercially available.

It was found that 1) 4A was the best zeolite of the three tested, 2) regeneration required operation at a higher temperature (600°-650° C.) than sulfidation temperatures, 3) a minimum of 14 cycles of sulfidation/regeneration could be successfully completed (with some duplication) without loss in activity, 4) nearly complete stoichiometric capacity, compared to unsupported sorbent, was maintained, 5) structural integrity of the zeolite structure (from XRD data) was maintained, and 6) uniform penetration of copper and molybdenum (and sulfur during sulfidation) was achieved throughout the zeolite matrix based on SEM elemental maps.

Results of these tests demonstrate that sodium deficient zeolite 4A prepared with mixed copper-molybdenum oxide is the best of the zeolites that were investigated for supporting this sorbent and that zeolites offer a significant advantage over typical alumina as support material. Alumina, in place of 4A zeolite, does not offer as high sulfidation properties nor reproducibly high regeneration at comparable temperatures to those of 4A zeolite. Based on the results of the tests, in which three different zeolites, alumina, and unsupported mixed metal oxides were compared, the advantages of zeolites, in particular, are demonstrated.

The sorbent of the invention effectively removes $H_2S$ from petrochemical sour gas in the temperature range of 350° C. The $CO_2$ can be removed in a second stage by plain zeolite at room temperature. The high porosity, rigid framework, alumina content and variety of composition and industrial form (pellets, washcoat, monolith) makes the zeolite supported mixed metal oxides effective and versatile sorbents for the moderate temperature applications contemplated herein.

It is to be realized that only preferred embodiments of the invention have been described and that numerous substitutions, modifications and alterations are permissible without departing from the spirit and scope of the invention as defined in the following claims.

We claim:

1. A sorbent for removing $H_2S$ from gas streams consisting essentially of a porous, crystalline, Group I or II metal zeolite molecular sieve support, having 1 to 20 weight percent of mixed binary metal oxides contained within the pores of said support, the binary oxides being consisting essentially of a first metal oxide selected from a Group VB, or a VIB metal oxide and a second metal oxide selected from a Group IB, IIB or VII metal oxide.

2. A sorbent according to claim 1 in which the surface area of the zeolite support is from 10 to 500 $m^2/g$ without the binary metal oxide and the surface area of the zeolite support containing the binary metal oxides is from 0.1 $m^2/g$ to 300 $m^2/g$.

3. A sorbent according to claim 2 in which the ratio of the second metal oxide to the first metal oxide is from 1/1 to 5/1.

4. A sorbent according to claim 3 in which the ratio of the second metal oxide to the first metal oxide is from 2/1 to 4/1.

5. A sorbent according to claim 3 in which the binary metal oxide is present in the zeolite support in an amount from 5 percent to 15 percent by weight.

6. A sorbent according to claim 1 in which the crystalline zeolite has a free lattice spacing of from about 3.5 Angstroms to about 10 Angstroms.

7. A sorbent according to claim 1 in which the molecular sieve is a sodium or calcium zeolite having a $SiO_2/AlO_2$ ratio varying ±20 percent from stoichiometry.

8. A sorbent according to claim 7 in which the support is a sodium zeolite containing less than 12 weight percent sodium.

9. A sorbent according to claim 8 in which the sodium content of the sodium zeolite is from 8 in which the sodium content of the sodium zeolite is from 1-3 weight percent.

10. A sorbent according to claim 1 in which the binary metal oxides are selected from V-Zn-O, V-Cu-O, Cu-Mo-O, Zn-Mo-O or Fe-Mo-O.

11. A sorbent according to claim 10 in which the binary oxides are selected from $Zn/V_2O_5$, $CuO/V_2O_5$, $ZnMoO_4/MoO_3$ or $FeMoO_4/MoO_3$.

12. A sorbent according to claim 1 prepared by repeated impregnation of the porous zeolite support with a solution of precursor salts of oxides of said first and second metal oxides followed by calcination of the impregnated support in an oxygen containing atmosphere to form said mixed metal binary oxides.

13. A sorbent according to claim 10 in which the mixed metal oxide is Cu-Mo-O.

14. A sorbent according to claim 1 in which the sorbent is in the form of particles of uneven or shaped zeolite particles, monolithic columns or channels of zeolite or a washcoat of zeolite on a support, said zeolites being porous and containing said mixed binary metal oxides within said pores.

* * * * *